United States Patent

Graboski et al.

Patent Number: 6,117,506
Date of Patent: Sep. 12, 2000

[54] MULTILAYER BOTTLE WITH ENCAPSULATED DARK LAYER

[75] Inventors: Edward J. Graboski, Mystic; James A. Desnoyers, Old Saybrook, both of Conn.

[73] Assignee: Silgan Plastics Corporation, Chesterfield, Mo.

[21] Appl. No.: 08/220,244

[22] Filed: Mar. 30, 1994

[51] Int. Cl.[7] .................................................. B65D 1/02
[52] U.S. Cl. ...................... 428/35.9; 428/35.7; 428/329; 428/215; 428/216; 206/524.1; 206/524.6; 264/512; 264/514; 264/515; 220/415
[58] Field of Search ............................... 428/35.7, 903.3, 428/212, 215, 216, 35.9, 329; 264/500, 512, 514, 515; 220/415; 206/524.1, 524.6

[56] References Cited

U.S. PATENT DOCUMENTS

| 3,547,294 | 12/1970 | Williams | 215/1 |
|---|---|---|---|
| 3,579,622 | 5/1971 | Shaw et al. | 264/99 |
| 4,053,666 | 10/1977 | Taylor et al. | 428/35 |
| 4,196,721 | 4/1980 | Posnansky | 126/421 |
| 4,482,586 | 11/1984 | Smith et al. | 428/35 |
| 4,943,458 | 7/1990 | Buecheler | 428/35.7 |
| 5,110,643 | 5/1992 | Akao et al. | 428/35.9 |
| 5,238,148 | 8/1993 | Holoubek et al. | 222/23 |

FOREIGN PATENT DOCUMENTS 9315887  8/1993  WIPO .

Primary Examiner—Ellis Robinson
Attorney, Agent, or Firm—Pepe & Hazard LLP

[57] ABSTRACT

A bottle for protecting its contents from degradation due to light has an integrally molded wall with three layers of the same synthetic resin. Each of the layers includes a colorant, the colorant of the intermediate layer providing a generally black opaque coloration and the colorant of the inner and outer layers providing a generally white opaque coloration to mask the black coloration of the intermediate layer.

17 Claims, 2 Drawing Sheets

MULTILAYER BOTTLE WITH ENCAPSULATED DARK LAYER

BACKGROUND OF THE INVENTION

The present invention relates to multilayer bottles, and more particularly, to a multilayer bottle with an encapsulated dark layer to limit passage of light rays therethrough.

Because of their numerous advantages, bottles molded from polyethylene and other synthetic resins have provided a suitable alternative to glass bottles for many applications. As is known, the shelf life of some food and pharmaceutical products is degraded by light. As a result, both glass and synthetic resin bottles have utilized colorants to reduce transmission of light therethrough. Some synthetic resin bottles have included various additives to absorb UV radiation. However, a very dark bottle which effectively precludes light transmission provides an undesirable aesthetic appearance, thereby adversely affecting its potential marketing appeal.

In addition, there has been a great incentive to recycle synthetic resins, including those that have been previously pigmented. Because the recycled material may have a variety of colors, it is difficult to employ it in new bottles unless there is sufficient quantity of the desired color to justify its segregation. As a result of this limitation, recycled resins of different colors are sometimes formed into a "muddy" colored mass which is then more heavily pigmented to provide a uniform coloration.

It is an object of the present invention to provide a novel multilayer bottle which substantially precludes light transmission therethrough, thereby protecting its contents from photodegradation.

It is also an object to provide such a multilayer bottle with a desirable aesthetic appearance.

Another object is to provide such a multilayer bottle which may incorporate recycled synthetic resins containing various colorants without detracting from its overall appearance.

A further object is to provide a method for making such a multilayer bottle readily and economically.

SUMMARY OF THE INVENTION

It has now been found that the foregoing and related objects may be readily attained in a bottle for protecting its contents from degradation due to light which has an integrally molded wall with three layers of the same synthetic resin. Each of the layers includes a colorant, and the colorant of the intermediate layer providing a generally black opaque coloration and the colorant of the inner and outer layers providing a generally white opaque coloration masking the black coloration of the intermediate layer.

Most desirably, the synthetic resin is high density polyethylene and the colorant of the intermediate layer is comprised of black oxide and ultramarine blue. The black oxide and the ultramarine blue are conveniently provided in a ratio of about 2 to 1, and is dispersed in resin to provide a concentrate containing about 50–60 percent by weight colorant. This concentrate and the synthetic resin of the intermediate layer are mixed in a weight ratio of about 1:6–10.

The colorant of the inner and outer layers is desirably titanium dioxide, and is used in a concentration of about 2–6 percent by weight.

The average thickness of each of the intermediate and outer layers is greater than the average thickness of the inner layer, and preferably the average thickness of the wall is about 0.016 to 0.085 inch. The average thickness of each of the outer and intermediate layers is about 0.006 to 0.034 inch, and the thickness of the inner layer is about 0.003 to 0.017 inch.

In forming the bottle, there are provided a first stream of synthetic resin containing a first colorant providing a generally black opaque coloration thereto, and second and third streams of synthetic resin containing a second colorant providing a generally white opaque coloration thereto. The streams of synthetic resin with the colorants are fed into an extrusion die to combine them in a laminar stream encapsulating the first stream between the second and third streams. The combined streams are extruded from the extrusion die through an annular outlet orifice to form a generally tubular length with inner and outer layers containing the second colorant and an intermediate layer containing the first colorant. The lower end of the generally tubular length is sealed to provide a parison which is placed into a mold cavity. This parison is expanded outwardly against the walls of the mold cavity to provide the bottle.

Preferably, gas is injected into a portion of the sealed tubular length above the seal to partially expand the portion into a parison of bulb-like configuration, and the bulb-like parison is severed from the generally tubular length to provide an open end therefor. Gas is injected into the open end to expand the bulb-like parison into the bottle configuration.

DETAILED DESCRIPTION OF THE PREFERRED EMBODIMENT

Figure 3:
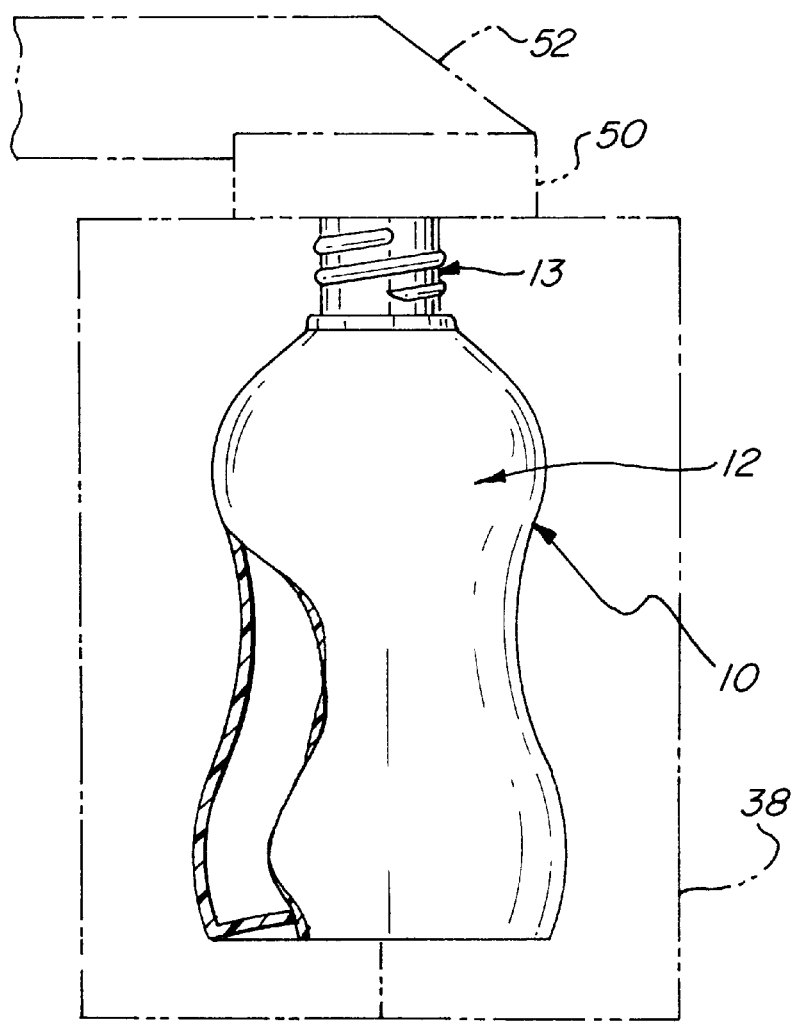
FIG. 3 is a schematic elevational view of the mold, blow head, and blow head arm of the extrusion blow molding apparatus drawn in phantom line and with a portion of the mold and bottle in section to show detail of the bottle therein.
Figure 4:
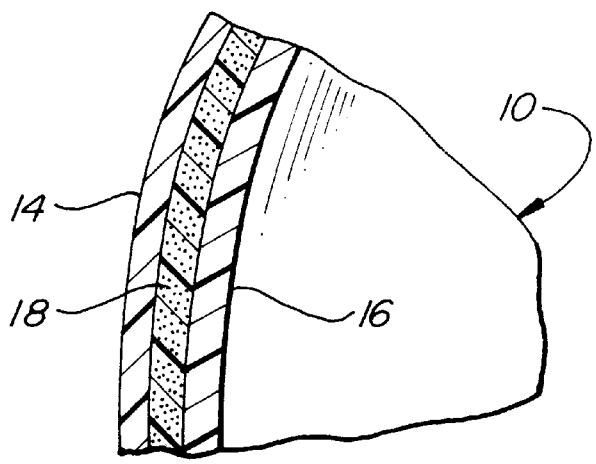
FIG. 4 is an enlarged sectional view of the bottle wall.

Turning first to FIGS. 3 and 4, a bottle 10 embodying the present invention is integrally molded with a body portion generally designated by the numeral 12 and a neck portion generally designated by the numeral 13. The wall of the bottle 10 has an outer layer 14, an inner layer 16, and an intermediate layer 18 therebetween. The intermediate layer 18 provides a generally black opaque coloration to block most of the light which would otherwise pass through the wall of the bottle 10. The outer layer 14 and inner layer 16 provide a generally white opaque coloration to mask the coloration of the intermediate layer 18, thereby providing a desirable bright clean appearance.

Figure 1:
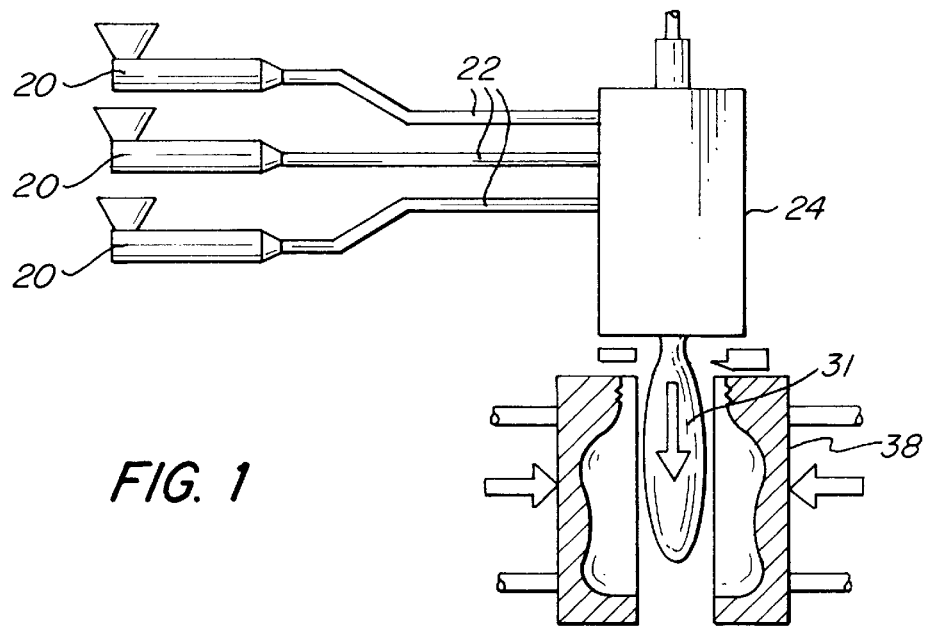
FIG. 1 is a schematic view of a portion of an extrusion blow molding apparatus used to form a bottle embodying the present invention.
Figure 2:
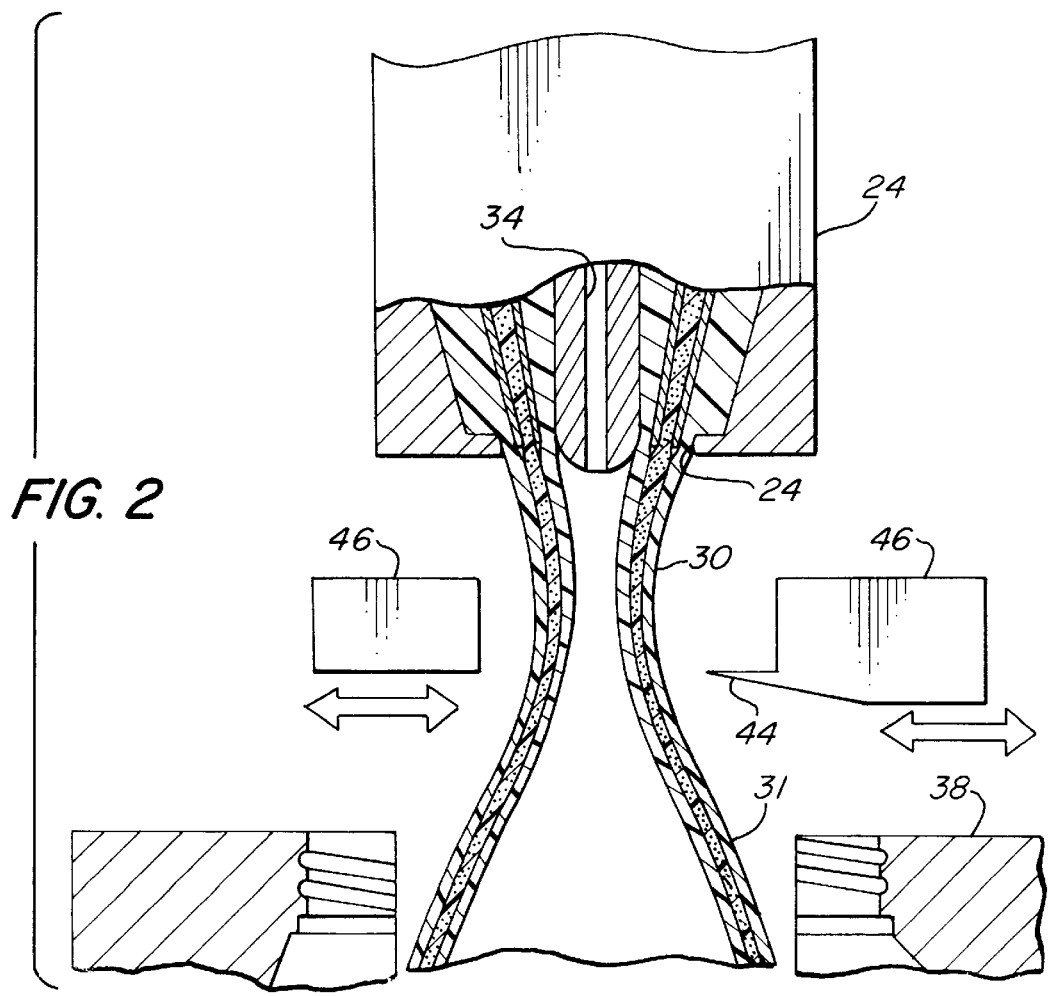
FIG. 2 is an enlarged view of a portion thereof with a portion of the extrusion die and parison in section to show detail.

Referring to FIGS. 1 and 2, the bottle 10 embodying the present invention may be fabricated using the extrusion blow molding apparatus shown therein. Illustrative of such apparatus is shaw U.S. Pat. No. 3,579,622 granted May 18, 1971, but other blow molding apparatus may also be employed. Three separate extruders 20 each provide a stream of synthetic resin which passes through the conduits 22 into the die block 24. The streams are of the same synthetic resin, but a colorant providing a generally black opaque coloration has been provided to one of the streams, while a colorant providing a generally white opaque coloration has been provided to the other two streams which encapsulate the black stream.

The composite stream is extruded through an annular orifice 28 to form a tubular stream 30 of synthetic resin. The outer and inner layers 14, 16 of the tubular stream 30 have the colorant providing a generally white opaque coloration while the intermediate layer 18 has the colorant providing a generally black opaque coloration.

Because of the semi-molten condition of the tubular stream 30, it may be collapsed at spaced points along its length to seal it and it may then be expanded by gas injected thereinto. As seen in FIGS. 1 and 2, air is injected through the bore 34 in the extrusion die 26 into a length 31 of the tubular stream 30 which has been previously sealed. This partially expands the tubular length 30 into a bulb-like parison 31. The bulb-like parison 31 continues into a position between the opposed halves of the mold 38.

Once the bulb-like parison 31 is clamped in the mold 38, it is severed from the generally tubular stream 30 to provide an open severed upper end (not shown) and to seal the lower end of the tubular stream thereabove. This severing is accomplished by the cutting blade 44 on the reciprocating sealing elements 46 to accomplish the sealing of the tubular stream 30 at the same time as the severing of the parison 31.

After severing the parison 31 and its seating in the mold 38, the mold 38 is moved from its position below the extrusion die 26, and a blow head 50 supported on a blow head arm 52 registers with the mold 38. Gas from the blow head 50 is forced into the open end of the parison 31 to expand the parison 31 against the walls of the mold 38 to form the bottle 10.

Although two separate extruders have been illustrated as providing separately the colored resin of the inner and outer layers, the output of a single extruder may be divided to provide both layers. However, for some applications, it may be desirable to incorporate different additions in the outer and inner layers.

The black coloration of the intermediate layer 18 is provided by a colorant which is preferably comprised of black oxide and ultramarine blue mixed in a ratio of about 2 to 1. This colorant may be dispersed in a resin concentrate containing 50–60 percent by weight colorant to facilitate blending in the resin, and this concentrate may be blended with the resin in a ratio of 1:6–8.

The coloration of the outer layer 14 and the inner layer 16 is desirably provided by a colorant such as titanium dioxide which may comprise 2–6 percent by weight of the resin, and preferably about 4 percent.

The wall of the bottle 10 preferably has an average thickness of about 0.015 to 0.085 inch. The outer and intermediate layers generally have a greater thickness than the inner layer. Desirably, the outer layer 14 and the intermediate layer 18 each has an average thickness of about 0.006 to 0.034 inch, and the inner layer has an average thickness of about 0.003 to 0.017 inch.

High density polyethylene is preferred for the resin because of its relatively low cost and desirable balance of properties which enable facile production of the multilayer bottle. However, other suitable synthetic resins may also be employed. Further, the inner layer may obtain some of its generally opaque characteristic from the recycled pigmented resin. The pigmentation required to provide the desired black opaque coloration will accordingly vary with the pigmentation in recycled resin.

Other pigments resulting in the described coloration for the various layers may be employed with satisfactory results. Alternate layer thicknesses may be appropriate for other synthetic resins and for other colorants.

Thus, it can be seen from the foregoing detailed specification and attached drawings that the multilayer bottle of the present invention will shield the contents from light rays to prevent photodegradation while providing an aesthetic appearance. Recycled synthetic resins may be incorporated into the multilayer bottle without detracting from the aesthetic appearance. By using well known extrusion blow molding processes, the bottle may be fabricated readily and economically.

Having thus described the invention, what is claimed is:

1. A bottle for protecting its associated contents from degradation due to light, said bottle having an integrally molded wall having three layers of the same synthetic resin, each of said layers including a colorant, the colorant of said intermediate layer providing a black opaque coloration substantially opaque to light transmission, and the colorant of the inner and outer layers providing a white opaque coloration masking said black coloration of said intermediate layer to provide an apparently uniform coloration for the inner and outer surfaces of said wall and concealing the multilayer character of said wall.

2. A bottle in accordance with claim 1 wherein said synthetic resin is high density polyethylene.

3. A bottle in accordance with claim 1 wherein said colorant of said intermediate layer is comprised of black oxide and ultramarine blue.

4. A bottle in accordance with claim 3 wherein said black oxide and said ultramarine blue are in a ratio of about 2 to 1.

5. A bottle in accordance with claim 3 wherein said colorant of said intermediate layer is dispersed in resin to provide a concentrate containing about 50–60 percent by weight colorant and said concentrate and said synthetic resin of said intermediate layer are mixed in a weight ratio of about 1:6–10.

6. A bottle in accordance with claim 1 wherein said colorant of said inner and outer layers is titanium dioxide.

7. A bottle in accordance with claim 6 wherein the concentration of said titanium dioxide is about 2–6 percent by weight.

8. A bottle in accordance with claim 1 wherein the average thickness of each of the intermediate and outer layers is greater than the average thickness of the inner layer.

9. A bottle in accordance with claim 1 wherein the average thickness of said wall is about 0.016 to 0.085 inch.

10. A bottle in accordance with claim 9 wherein the average thickness of each of said outer and intermediate layers is about 0.006 to 0.034 inch and the thickness of the inner layer is about 0.003 to 0.017 inch.

11. A method of forming a bottle having three layers of the same synthetic resin, with an intermediate layer having a generally black opaque coloration and inner and out layers having a generally white opaque coloration masking the coloration of the intermediate layer, comprising the steps of:

(a) providing a first stream of synthetic resin containing a first colorant providing a black opaque coloration thereto;

(b) providing second and third streams of synthetic resin containing a second colorant providing a white opaque coloration thereto;

(c) feeding the streams of synthetic resin with the colorants into an extrusion die to combine them in a laminar stream encapsulating said first stream between said second and third streams;

(d) extruding said combined streams from said extrusion die through an annular outlet orifice to form a generally tubular length with inner and outer layers containing said second colorant and an intermediate layer containing said first colorant;

(e) sealing the lower end of said generally tubular length to provide a parison;

(f) placing said parison into a mold cavity; and (g) expanding said tubular length outwardly against the walls of said mold cavity to form a bottle for protecting its associated contents from degradation due to light, said bottle having an integrally molded wall having three layers of the same synthetic resin, each of said layers including a colorant, the colorant of said intermediate layer providing a black opaque coloration substantially opaque to light transmission, and the colorant of the inner and outer layers providing a white opaque coloration masking said black coloration of said intermediate layer to provide an apparently uniform coloration for the inner and outer surfaces of said wall and concealing the multilayer character of said wall.

12. The method of making a bottle in accordance with claim 11 including the steps of:

(a) injecting gas into a portion of said sealed tubular length above the seal to partially expand the portion into a parison of bulb-like shape; and (b) severing said bulb-like parison from said generally tubular length to provide an open end therefor.

13. The method of making a bottle in accordance with claim 12 wherein gas is injected into said open end to expand said parison into the bottle configuration.

14. The method of making a bottle in accordance with claim 11 wherein said synthetic resin of said streams is high density polyethylene.

15. The method of making a bottle in accordance with claim 11 wherein said first colorant is comprised of black oxide and ultramarine blue and wherein second colorant is titanium dioxide.

16. The method of making a bottle in accordance with claim 11 wherein the extruding step produces a tubular length in which each of the outer and intermediate layers is of greater thickness than said inner layer.

17. The method of making a bottle in accordance with claim 16 wherein said expanding step provides a bottle with an average wall thickness of 0.015 to 0.085 inch thickness.

* * * * *